United States Patent
Allin et al.

(10) Patent No.: US 10,409,392 B1
(45) Date of Patent: Sep. 10, 2019

(54) HAND-HELD CONTROLLER TRACKED BY LED MOUNTED UNDER A CONCAVED DOME

(71) Applicant: Facebook Technologies, LLC, Menlo Park, CA (US)

(72) Inventors: Boyd Drew Allin, Seattle, WA (US); Mark Shintaro Ando, Seattle, WA (US); Glen Jason Tompkins, Woodinville, WA (US); Andrew Melim, Redwood City, CA (US); Robert Carey Leonard, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 3 days.

(21) Appl. No.: 15/730,523

(22) Filed: Oct. 11, 2017

(51) Int. Cl.
| | |
|---|---|
| *G06F 3/03* | (2006.01) |
| *G06F 3/01* | (2006.01) |
| *G06F 3/0346* | (2013.01) |
| *A63F 13/24* | (2014.01) |
| *G06F 3/0484* | (2013.01) |
| *G06F 3/02* | (2006.01) |

(52) U.S. Cl.
CPC ............ *G06F 3/0308* (2013.01); *A63F 13/24* (2014.09); *G06F 3/011* (2013.01); *G06F 3/0202* (2013.01); *G06F 3/0346* (2013.01); *G06F 3/04847* (2013.01)

(58) Field of Classification Search
CPC ......... G06F 308/0308; G06F 308/0346; G06F 308/04847; G06F 308/011; G06F 308/0202; G06F 3/0308; G06F 3/0346; G06F 3/04847; G06F 3/011; G06F 3/0202; A63F 13/24
See application file for complete search history.

(56) References Cited

U.S. PATENT DOCUMENTS

| | | | | |
|---|---|---|---|---|
| 4,301,461 | A * | 11/1981 | Asano ..................... | H01L 33/54 250/552 |
| 5,893,633 | A * | 4/1999 | Uchio ....................... | F21K 9/00 257/E25.02 |
| 6,328,456 | B1 * | 12/2001 | Mize ....................... | H01L 33/54 257/E33.059 |
| D656,996 | S * | 4/2012 | Mikhailov ................... | D14/401 |
| 9,977,494 | B2 * | 5/2018 | Drinkwater ............. | G06F 3/011 |
| 2006/0087838 | A1 * | 4/2006 | Grajcar ..................... | F21K 9/00 362/227 |

(Continued)

*Primary Examiner* — Mihir K Rayan
(74) *Attorney, Agent, or Firm* — Fenwick & West LLP

(57) ABSTRACT

A hand-held controller is enables a user to manipulate objects in a VR environment with hand movement. The hand-held controller includes a handle, a ring attached to an end of the handle and one or more light emitting diodes (LEDs). The handle has appropriate shape and dimensions so that it can be grasped by the user's hand. The ring has an outer body that includes an inner surface that is formed with one or more concave dome and an outer surface facing away from the inner surface. Each of the one or more LED is mounted under a concaved dome. Light emitted from the LED spreads at the concaved dome to form uniform illuminous intensity. The light transmits out of the body through the outer surface of the outer body. The light can be captured by a camera for tracking the hand-held controller.

12 Claims, 6 Drawing Sheets

(56) References Cited

U.S. PATENT DOCUMENTS

| | | | | |
|---|---|---|---|---|
| 2009/0279296 A1* | 11/2009 | Chang | ................... | F21V 5/04 |
| | | | | 362/235 |
| 2009/0298590 A1* | 12/2009 | Marks | ................... | A63F 13/02 |
| | | | | 463/37 |
| 2011/0286200 A1* | 11/2011 | Iimura | ................... | F21V 7/041 |
| | | | | 362/84 |
| 2017/0192506 A1* | 7/2017 | Andersen | ................ | G06F 3/014 |
| 2018/0311575 A1* | 11/2018 | Bristol | ................... | A63F 13/24 |

* cited by examiner

US 10,409,392 B1

HAND-HELD CONTROLLER TRACKED BY LED MOUNTED UNDER A CONCAVED DOME

BACKGROUND

Field of the Disclosure

The present disclosure generally relates to virtual reality (VR) controllers, and specifically to a hand-held VR controller tracked by light emitting diodes (LEDs) mounted under concaved domes.

Description of the Related Arts

VR systems may include a controller to translate movement of the user's body into tangible action in a virtual world. The controller may let the user make social gestures like point, wave, and give a thumbs-up or manipulate objects in the virtual space, pick up toys or fire laser guns with intuitive, natural hand movement. For example, hand-held controllers are used to track a user's hand motion, position, natural gestures, and finger movement to create a sense of hand presence for more realistic and tactile VR.

A hand-held controller is often tracked by the VR systems by using a LED and cameras capturing light emitted by the LED. However, most illuminous intensity is distributed on the direction in which the LED emits light, the hand-held controller cannot be effectively tracked when it moves to a position where light in the emitting direction is outside the field of view of the camera.

SUMMARY

Embodiments relate to a hand-held controller of a VR system tracked by a LED with uniform illuminator intensity over a wide range of angle. The hand-held controller includes a handle, a ring attached to an end of the handle, and a LED. The handle is shaped and dimension to be grasped by a user's hand. The ring has an outer body that includes an inner surface formed with a concaved dome and an outer surface facing away from the inner surface. The LED is mounted under the concaved dome and emit light into the concaved dome. The light spreads at the concaved dome. The concaved dome is positioned, shaped, and dimensioned to cause uniform illuminous intensity. The spread light transmits out of the ring through the outer surface. The light can be captured by an image device to track a position or orientation of the hand-held controller. Because of the uniform illuminator intensity in the wide range of angles, the hand-held controller can be effectively tracked even when the emitting direction of the LED is not in a field of view of the imaging device. The hand-held controller can have more than one LEDs, each of which is mounted under a concaved dome.

In some embodiments, the hand-held controller is part of a HMD system. The HMD system may operate in a VR system environment or a mixed reality (MR) system environment. The HMD system comprises an HMD, a HMD console, and the hand-held controller. The HMD presents images (2D or 3D) to a use. A hand of the user grasps the hand-held controller and the hand-held controller is used to track motion of the hand of the user. The HMD console is coupled to the hand-held controller and the HMD and controls the hand-held controller and the HMD. In some embodiments, the HMD system includes another hand-held controller to track motion of the other hand of the user.

BRIEF DESCRIPTION OF THE DRAWINGS

The teachings of the embodiments can be readily understood by considering the following detailed description in conjunction with the accompanying drawings.

The figures depict various embodiments for purposes of illustration only.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digits of each reference number corresponds to the figure in which the reference number is first used.

Embodiments relate to a hand-held VR controller to track a user's hand motion and position. The hand-held controller includes a handle extending in a longitudinal direction. A body is attached to an end of the handle and has a curved outer surface and a curved inner surface. LEDs are mounted on the curved outer surface and configured to emit light to be captured by an imaging device for tracking a position or orientation of the hand-held controller.

Figure 1:
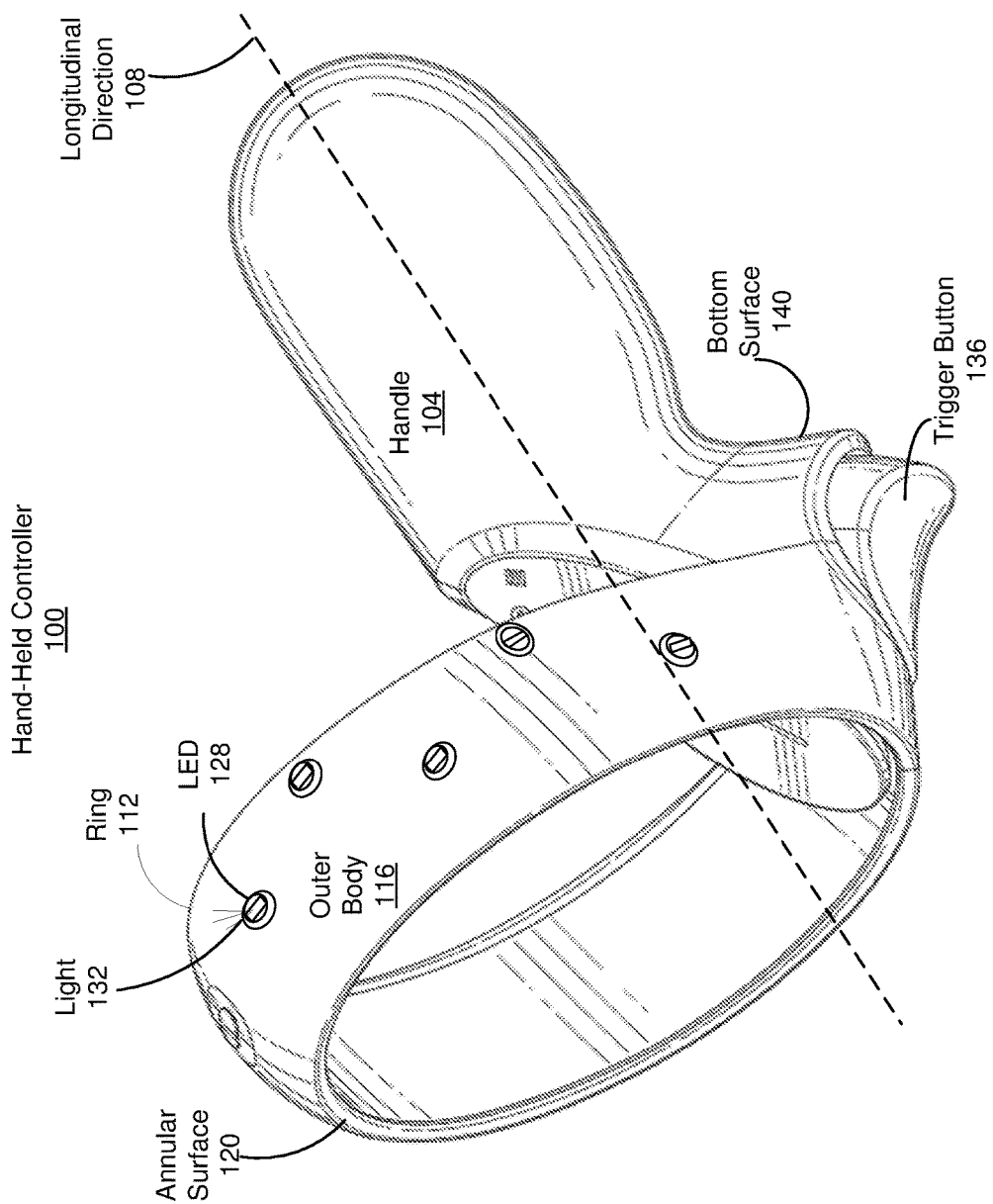
FIG. 1 is an example schematic perspective view of a hand-held controller, in accordance with an embodiment.

FIG. 1 is an example schematic perspective view of a hand-held controller 100, in accordance with an embodiment. The hand-held controller 100 may be included in a VR system as a stand-alone controller or as part of a pair of tracked controllers that give a user "hand presence"—the feeling that the user's virtual hands are actually his own. The hand-held controller 100 may enable the user to manipulate objects in a virtual space with precision and intuitive, natural hand movement. The hand-held controller 100 includes a handle 104, a ring 112, and a trigger button 136. In other embodiments, the hand-held controller 100 can include different, additional, or fewer components.

The handle 104 extends in a longitudinal direction 108. In one embodiment, the handle 104 may be made of an engineering plastic, such as injection-molded polycarbonate (PC)/acrylonitrile butadiene styrene (ABS) or polyamide (nylon). In other embodiments, the handle 104 may be made of wood or metal. The handle 104 may be resistant to impact and abrasion. The material of the handle 104 may exhibit heat resistance, mechanical strength, or rigidity.

The handle 104 is shaped and dimensioned to be grasped by a user's hand for tracking natural gestures and finger movements to create more realistic and tactile VR. For example, the handle may have a cylindrical shape. The handle 104 of the hand-held controller 100 may bend or curve to balance the weight of the controller 100, such that it rests naturally in the top of the palm of the user or the crook of the user's fingers. The user may therefore comfortably hold the hand-held controller 100 without dropping it. Even if the user tries to open his hand completely when holding the hand-held controller 100 normally, the user's fingers may catch on the ring 112 and support the hand-held controller 100's weight.

The ring 112 is attached to an end of the handle 104 and has an annular surface 120. The ring may be made of engineering plastic. In one embodiment, the ring is made of infrared-transparent polycarbonate. The ring 112 may surround a thumb of the user when the handle 104 is grasped by the user's hand. The ring 112 has an outer body 116. As illustrated in FIG. 1, the outer body 116 is curved. In other embodiments, the outer body 116 may have other shapes. The curved outer body 116 includes an inner surface 330 and an outer surface 340 facing away from the inner surface 330 (shown in FIG. 3). The inner surface 330 is formed with a plurality of concaved domes 310 (shown in FIG. 3)

The LEDs 128 are mounted under the concaved domes 310, i.e., under the outer body 116. For purpose of illustration, the LEDs 128 are shown in FIG. 1 but they may be occluded under the outer body 116. In embodiments where the outer body 116 is transparent or translucent, the LEDs 128 can be at least partially visible. In some embodiment, each of the LEDs 128 is mounted under a concaved dome 310. A LED 128 faces the concaved dome 310 and emits light to the concaved dome 310. The concave dome 310 is positioned, shaped, and dimensioned to spread the emitted light for uniform illumination intensity. The light 132 transmits out of the outer body 116 through the outer surface 340. A VR system may include a camera to track a position or orientation of the hand-held controller 100 by capturing the light 132. For example, a camera may be mounted on a computer monitor covering a field of view including the hand-held controller 100.

The trigger button 136 is located on a bottom surface 140 of the handle 104. The trigger button 136 may be pressed by an index or middle finger of the user's hand. The trigger button 136 may provide a signal for grasping, lifting, etc., of virtual objects in a VR space. The trigger button 136 may have a symmetrical shape, such as rectangular, elliptical or circular. The trigger button 136 may be made of rubber or plastic.

Figure 2:
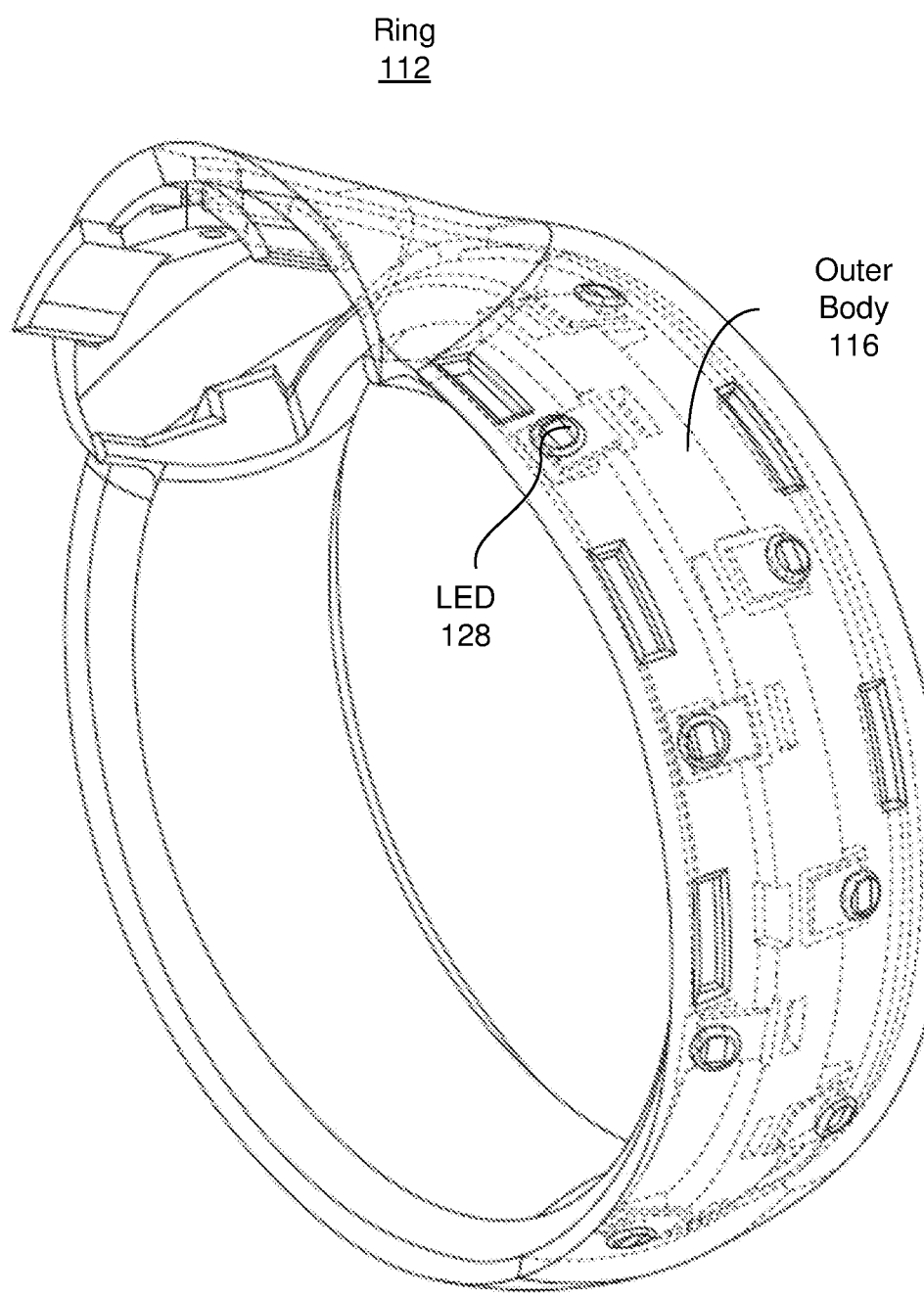
FIG. 2 is an example schematic perspective view of a ring of the hand-held controller, in accordance with an embodiment.

FIG. 2 is an example schematic perspective view of a ring 112 of the hand-held controller 100, in accordance with an embodiment. The ring has the curved outer surface 116. A group of LEDs 128 are located under the outer body 116. FIG. 2 shows eight LEDs 128 on the ring 112. Different embodiments may have a different number of LEDs 128. The LEDs 128 can emit light in the visible band (i.e., ~380 nm to 750 nm), in the infrared (IR) band (i.e., ~750 nm to 1 mm), in the ultraviolet band (i.e., 10 nm to 380 nm), some other portion of the electromagnetic spectrum, or some combination thereof.

Figure 3:
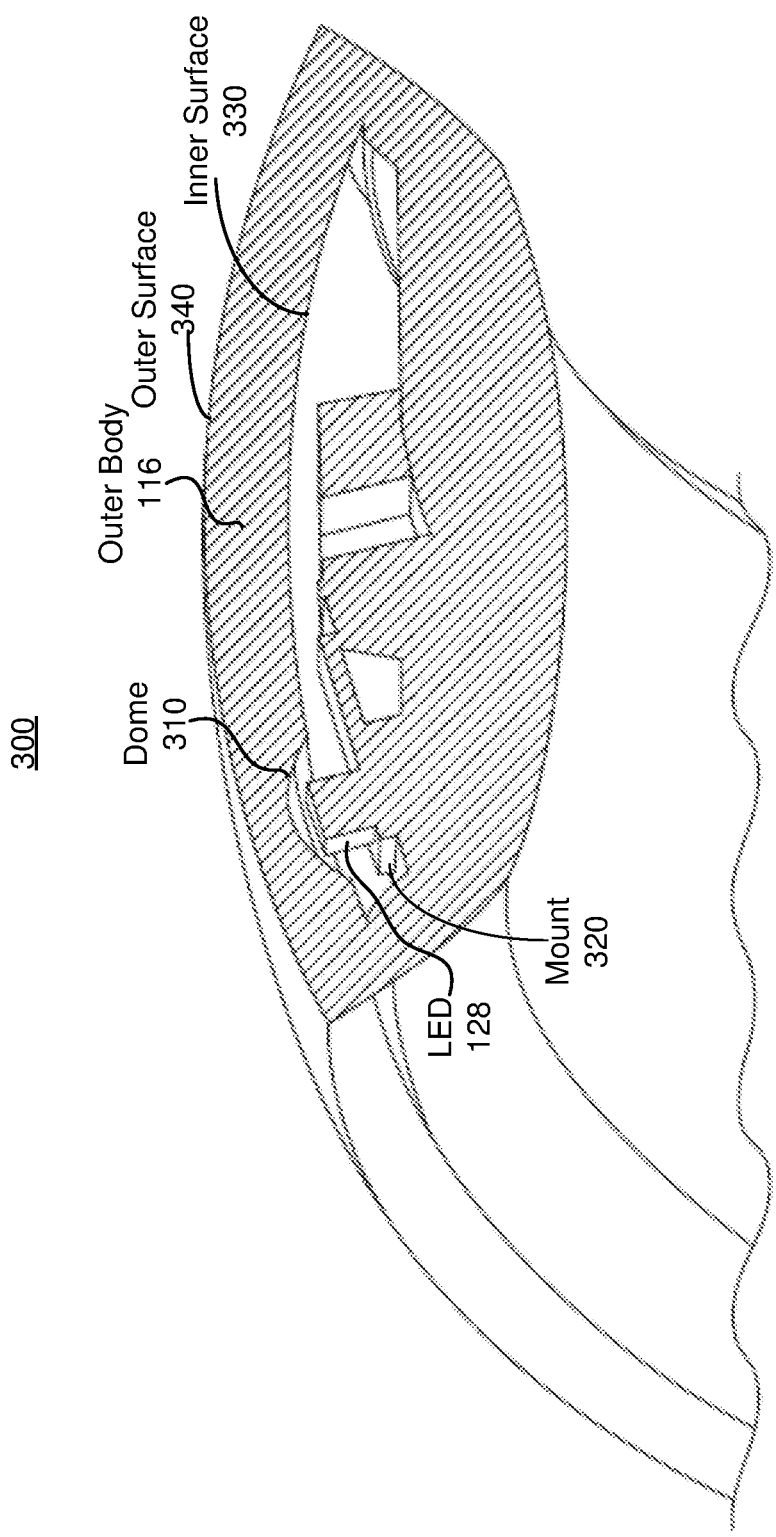
FIG. 3 is a cross-sectional view of the ring of the hand-held controller, in accordance with an embodiment.

FIG. 3 is a cross-sectional view 300 of the ring 112 of the hand-held controller 100, in accordance with an embodiment. The cross-sectional view 300 is taken along a cross-section to illustrate only a single LED 128. As shown in FIG. 3, the LED 128 is attached on a mount 320 under a concaved dome 310. A portion of the LED 128, including a top surface of the LED 128 is enclosed within the concaved dome 310. In some embodiments, 0.2 mm of the LED 128's top surface is recessed into the concaved dome.

The concaved dome 310 may be formed by carving out the inner surface 340 of the outer body 116. In the embodiment of FIG. 3, the inner surface 340 and the outer surface 350 of the outer body 116 are curved. In an alternative embodiment, either the inner surface 340 or the outer surface 350 can be flat. The LED 128 faces the concaved dome to emit light into the concaved dome 310. The light emitted from the LED 128 reaches the concaved dome 310 and is spread at the concaved dome 310 into multiple directions. The concave dome 310 is positioned, shaped, and dimensioned to achieve generally uniform illumination intensity between approximately −90 degrees from the light emitting direction and approximately 90 degrees from the light emitting direction. More details regarding position, shape and dimension of the concaved dome 310 are provided in conjunction with FIG. 4.

The light with uniform illuminous intensity transmits out of the outer surface 340 and can be captured by an imaging device within its field of view. The imaging device generates tracking information, e.g., images of the hand-held controller 100, based on the captured light. The VR system then uses the tracking information to track a position or orientation of the hand-held controller 100. Because the light has uniform illuminous intensity between approximately −90 degrees from the light emitting direction and approximately 90 degrees from the light emitting direction, the hand-held controller 100 can be effectively tracked by the imaging device even if it moves to a position where the top of the LED faces the imaging device in a slanted angle or even when the top of the LED faces in a direction perpendicular to the direction towards the imaging device.

Figure 4:
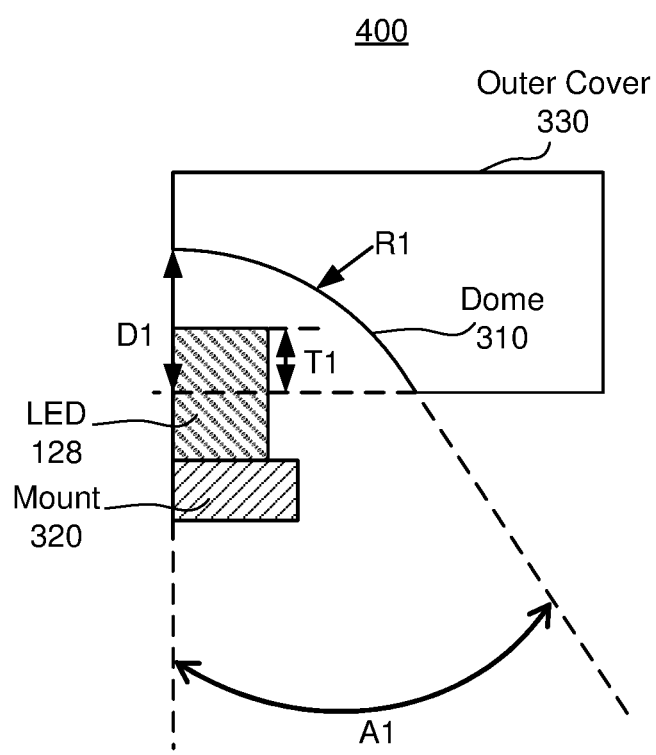
FIG. 4 is a diagram showing position, shape, and dimensions of a concaved dome under which a LED is mounted, in accordance with an embodiment.

FIG. 4 is a diagram showing position, shape, and dimensions of a concaved dome 310 under which a LED 128 is mounted, in accordance with an embodiment. The LED 128 is attached on a mount 320. FIG. 4 shows the right half of the concaved dome 310, the LED 128, and the mount 320. In the embodiment of FIG. 4, the left half of the concaved dome 310, the LED 128, and the mount 320 mirrors their right half, i.e., the concaved dome 310, the LED 128, and the mount 320 are symmetric. In other embodiments, the left and the right sides of the concaved dome 310, the LED 128, and the mount 320 can by asymmetric.

As shown in FIG. 4, the center of the top surface lines up with the center of the concaved dome 310. Also, a top surface of the LED 128 is recessed into the concaved dome 310 by T1. In some embodiments, T1 falls into a range from 0.1 to 0.3 mm. For example, T1 is 0.2 mm.

In the embodiment of FIG. 4, the top surface of the LED 128 is a rectangular. The rectangular has a length of 2.3 mm. In other embodiments, the top surface of the LED 128 can have different shapes with different dimensions. In some embodiments, a ratio of a length of the top surface of the LED 128 to a radius R1 of the concaved dome 310 is approximately 1.3. An opening angle A1 of the concaved dome 310 is 45 to 55 degrees. In one embodiment, the concaved dome 310 has a depth D1 of 0.8 mm, a radius R1 of 1.75 mm, and an opening angle A1 of 50 degrees.

Figure 5A:
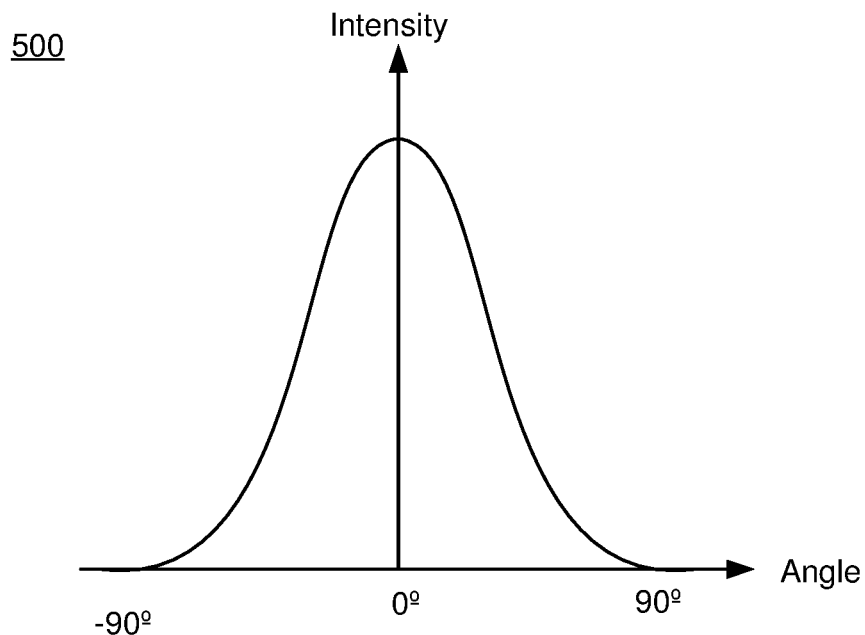
FIG. 5A is a diagram illustrating distribution of illuminous intensity of a LED that is not mounted under a concaved dome, in accordance with an embodiment.

FIG. 5A is a diagram 500 illustrating distribution of illuminous intensity of a LED that is not mounted under a concaved dome, in accordance with an embodiment. The LED has an emitting direction that is normal to a top surface of the LED. The diagram 500 shows the illuminous intensity of the LED as a function of angle. In some embodiments, the angle is beam angle, i.e., an angle between a light beam from the emitting direction of the LED. The emitting direction of the LED has a beam angle of 0 degree.

The diagram 500 shows the illuminous intensity of the LED from −90 to 90 degrees. As shown in FIG. 5A, the light beam at 0 degree (i.e., the emitting direction) has the highest illumination intensity, but the intensity drops significantly as the angle increases. Thus, light beams in directions other than the emitting direction has significantly low illuminous intensity. Accordingly, an imaging device can barely capture light emitted from the LED when the LED is in a position where its emitting direction is not in the field of view of the imaging device. The imaging device cannot generate effective tracking information.

Figure 5B:
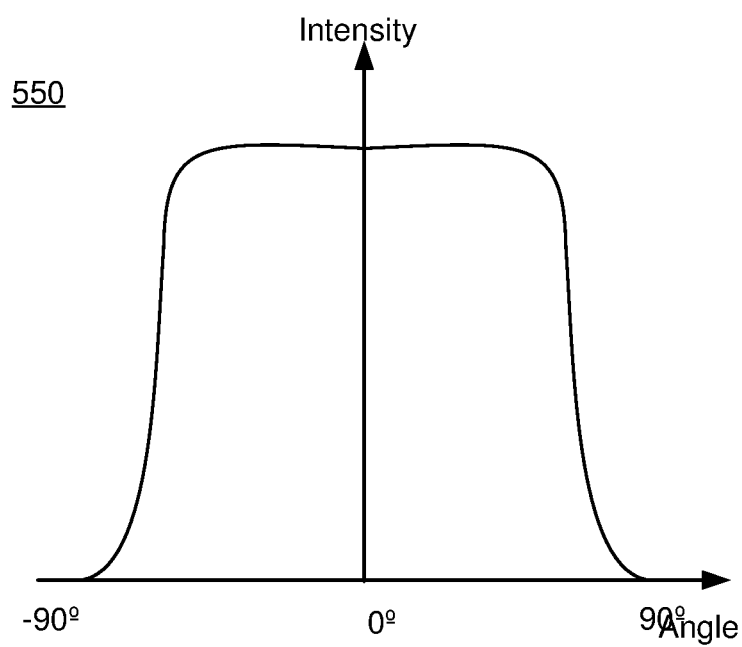
FIG. 5B is a diagram illustrating distribution of illuminous intensity of a LED that is mounted under a concaved dome, in accordance with an embodiment.

FIG. 5B is a diagram 550 illustrating distribution of illuminous intensity of a LED that is mounted under a concaved dome, in accordance with an embodiment. Compared with the diagram 500, the diagram 550 shows a relatively uniform distribution of illuminous intensity from −90 degrees to 90 degrees, indicating that light beams in directions other than the emitting direction has substantially similar illuminous intensity as the light beam in the emitting direction. Thus, even when the LED is in a position where its emitting direction is not in the field of view of the imaging device, the imaging device can still capture light to generate effective tracking information.

Figure 6:
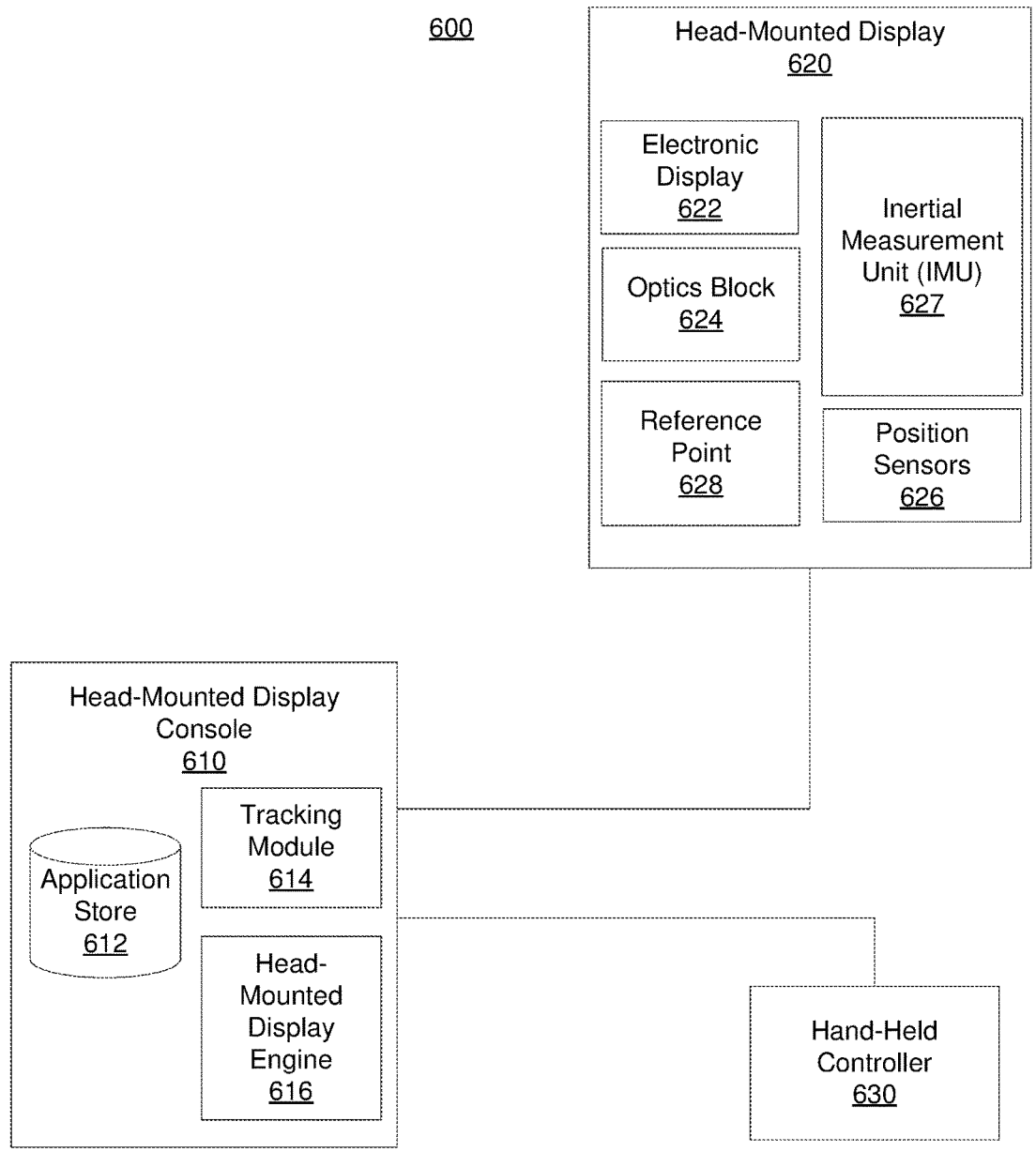
FIG. 6 is a block diagram of a HMD system in which the hand-held controller operates, in accordance with an embodiment.

FIG. 6 is a block diagram of a HMD system 600 in which the hand-held controller 100 operates, in accordance with an embodiment. The HMD system 600 may operate in a VR system environment or an MR system environment. The HMD system 600 shown by FIG. 6 comprises a HMD console 610 coupled to a HMD 620 and a hand-held controller 630. While FIG. 6 shows an example system 600 including one HMD 620 and one hand-held controller 630, in other embodiments any number of these components may be included in the system 600. For example, there may be multiple HMDs 620, each having an associated hand-held controller 630 and communicating with the HMD console 610. In alternative configurations, different and/or additional components may be included in the HMD system 600. Similarly, functionality of one or more of the components can be distributed among the components in a different manner than is described here. For example, some or all of the functionality of the HMD console 610 may be contained within the HMD 620.

The HMD 620 is a head-mounted display that presents content to a user comprising virtual and/or augmented views of a physical, real-world environment with computer-generated elements (e.g., 2D or 3D images, 2D or 3D video, sound, etc.). Examples of media presented by the HMD 620 include one or more images, video, audio, or some combination thereof. In some embodiments, audio is presented via an external device (e.g., speakers and/or headphones) that receives audio information from the HMD 620, the HMD console 610, or both, and presents audio data based on the audio information.

The HMD 620 includes an electronic display 622, an optics block 624, an inertial measurement unit (IMU) 627, one or more position sensors 626, and a reference point 628. Some embodiments of the HMD 620 have different components than those described here.

The IMU 627 is an electronic device that generates fast calibration data based on measurement signals received from one or more of the position sensors 626. A position sensor 626 generates one or more measurement signals in response to motion of the HMD 620. Examples of position sensors 626 include: one or more accelerometers, one or more gyroscopes, one or more magnetometers, another suitable type of sensor that detects motion, a type of sensor used for error correction of the IMU 627, or some combination thereof. The position sensors 626 may be located external to the IMU 627, internal to the IMU 627, or some combination thereof.

Based on the one or more measurement signals from one or more position sensors 626, the IMU 627 generates fast calibration data indicating an estimated position of the HMD 620 relative to an initial position of the HMD 620. For example, the position sensors 626 include multiple accelerometers to measure translational motion (forward/back, up/down, left/right) and multiple gyroscopes to measure rotational motion (e.g., pitch, yaw, or roll). In some embodiments, the IMU 627 rapidly samples the measurement signals and calculates the estimated position of the HMD 620 from the sampled data. For example, the IMU 627 integrates the measurement signals received from the accelerometers over time to estimate a velocity vector and integrates the velocity vector over time to determine an estimated position of a reference point on the HMD 620. The reference point 628 is a point that may be used to describe the position of the HMD 620. While the reference point may generally be defined as a point in space; however, in practice the reference point is defined as a point within the HMD 620 (e.g., a center of the IMU 627).

In some embodiments, the IMU 627 receives one or more calibration parameters, e.g., from the HMD console 610. The one or more calibration parameters are used to maintain tracking of the HMD 620. Based on a received calibration parameter, the IMU 627 may adjust one or more IMU parameters (e.g., sample rate). In some embodiments, certain calibration parameters cause the IMU 627 to update an initial position of the reference point 628 so it corresponds to a next calibrated position of the reference point 628. Updating the initial position of the reference point 628 as the next calibrated position of the reference point 628 helps reduce accumulated error associated with the determined estimated position. The accumulated error, also referred to as drift error, causes the estimated position of the reference point 628 to "drift" away from the actual position of the reference point 628 over time.

The hand-held controller 630 is a device that allows a user to send action requests to the HMD console 610. An action request is a request to perform a particular action. For example, an action request may be to start or end an application or to perform a particular action within the application. The hand-held controller 630 may include one or more input devices. Example input devices include: a keyboard, a mouse, a game controller, or any other suitable device for receiving action requests and communicating the received action requests to the HMD console 610.

An action request received by the hand-held controller 630 is communicated to the HMD console 610, which performs an action corresponding to the action request. In some embodiments, the hand-held controller 630 may provide haptic feedback to the user in accordance with instructions received from the HMD console 610. For example, haptic feedback is provided when an action request is received, or the HMD console 610 communicates instructions to the hand-held controller 630 causing the hand-held controller 630 to generate haptic feedback when the HMD console 610 performs an action. An embodiment of the hand-held controller 630 is the hand-held controller 100 described in conjunction with FIG. 1.

The HMD console 610 provides media to the HMD 620 for presentation to the user in accordance with information received from the HMD 620 and/or the Hand-held controller 100. In the example shown in FIG. 6, the HMD console 610 includes an application store 612, a tracking module 614, and a HMD engine 616. Some embodiments of the HMD console 610 have different modules than those described in conjunction with FIG. 6. Similarly, the functions further described below may be distributed among components of the HMD console 610 in a different manner than is described here.

The application store 612 stores one or more applications for execution by the HMD console 610. An application is a group of instructions, that when executed by a processor, generates content for presentation to the user. Content generated by an application may be in response to inputs received from the user via movement of the HMD 620 or the Hand-held controller 100. Examples of applications include: gaming applications, conferencing applications, video playback application, or other suitable applications.

The tracking module 614 calibrates the HMD system 600 using one or more calibration parameters and may adjust one or more calibration parameters to reduce error in determination of the position of the HMD 620. Moreover, calibration performed by the tracking module 614 also accounts for information received from the IMU 627. Additionally, if tracking of the HMD 620 is lost, the tracking module 614 re-calibrates some or all of the HMD system 600.

The tracking module 614 tracks movements of the HMD 620. The tracking module 614 determines positions of a reference point of the HMD 620 using position information from fast calibration information. Additionally, in some embodiments, the tracking module 614 may use portions of the fast calibration information to predict a future location of the HMD 620. Alternatively, the tracking module 614 may use depth information generated by the DMA 300 to track movements of the HMD 620. For example, the DMA 300 generates depth information of an object that is still as to the local area surrounding the HMD 620. Using the depth information, the tracing module 614 can determine movements of the object relative to the HMD 620, which is opposite to movements of the HMD 620 in the local area. The tracking module 614 provides the estimated or predicted future position of the HMD 620 to the HMD engine 616.

The HMD engine 616 executes applications within the system environment 100 and receives depth information, position information, acceleration information, velocity information, predicted future positions, or some combination thereof of the HMD 620 from the tracking module 614. Based on the received information, the HMD engine 616 determines content to provide to the HMD 620 for presentation to the user. For example, if the received depth information indicates that an object has moved further from the HMD 620, the HMD engine 616 generates content for the HMD 620 that mirrors the object's movement in an augmented reality environment. Additionally, the HMD engine 616 performs an action within an application executing on the HMD console 610 in response to an action request received from the Hand-held controller 100 and provides feedback to the user that the action was performed. The provided feedback may be visual or audible feedback via the HMD 620 or haptic feedback via the Hand-held controller 100.

The language used in the specification has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed is:

1. A handheld controller, comprising:
a handle shaped and dimensioned to be grasped by a user's hand;
a body attached to an end of the handle, the body having:
an inner surface formed with a plurality of concaved domes, and
an outer surface facing away from the inner surface; and
a plurality of light emitting diodes (LEDs) emitting light, each of the LEDs mounted under each of the plurality of concaved domes and facing the concaved dome to emit light into the concaved dome,
wherein the light emitted by the LEDs is spread at the concaved domes and transmitted out of the body through the outer surface for capturing by an imaging device to track a position or orientation of the handheld controller.

2. The device of claim 1, wherein a top surface of each of the LEDs is enclosed by the corresponding concaved dome.

3. The device of claim 1, wherein an opening angle of each of the plurality of concaved domes is 45 to 55 degrees.

4. The device of claim 1, wherein a ratio of a length of each of the LEDs to a radius of the corresponding concaved dome is approximately 1.3.

5. The device of claim 1, wherein 0.2 mm of each of the LEDs is recessed into the corresponding concaved dome.

6. The device of claim 1, wherein the outer surface and the inner surface of the body are curved.

7. A method of emitting light to track a handheld controller, comprising:
emitting light from each of a plurality of light emitting diodes (LEDs) to each of a plurality of concaved domes in an inner surface of the handheld controller, at least a portion of each of the LEDs enclosed within the corresponding concaved dome;
spreading the emitted light at the plurality of concaved domes by refraction; and
transmitting the refracted light out of the body through an outer surface of the handheld controller for capturing by an imaging device to track a position or orientation of the handheld controller.

8. The method of claim 7, wherein a top surface of each of the LEDs is enclosed by the corresponding concaved dome.

9. The method of claim 7, wherein an opening angle of each of the plurality of concaved domes is 45 to 55 degrees.

10. The method of claim 7, wherein a ratio of a length of each of the LEDs to a radius of the corresponding concaved dome is approximately 1.3.

11. The method of claim 7, wherein 0.2 mm of each of the LEDs is recessed into the corresponding concaved dome.

12. The method of claim 7, wherein the outer surface and the inner surface of the body are curved.

* * * * *